United States Patent
Madraswala et al.

(10) Patent No.: US 10,175,903 B2
(45) Date of Patent: Jan. 8, 2019

(54) N PLANE TO 2N PLANE INTERFACE IN A SOLID STATE DRIVE (SSD) ARCHITECTURE

(71) Applicant: Intel Corporation, Santa Clara, CA (US)

(72) Inventors: Aliasgar S Madraswala, Folsom, CA (US); Xin Guo, San Jose, CA (US); Joel T Jorgensen, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 110 days.

(21) Appl. No.: 15/087,071

(22) Filed: Mar. 31, 2016

(65) Prior Publication Data

US 2017/0285991 A1 Oct. 5, 2017

(51) Int. Cl.
  *G06F 12/02* (2006.01)
  *G06F 12/08* (2016.01)
  *G06F 3/06* (2006.01)

(52) U.S. Cl.
  CPC .......... *G06F 3/0626* (2013.01); *G06F 3/0658* (2013.01); *G06F 3/0659* (2013.01); *G06F 3/0679* (2013.01)

(58) Field of Classification Search
  CPC .... G06F 3/0626; G06F 3/0658; G06F 3/0659; G06F 3/0679
  See application file for complete search history.

(56) References Cited

U.S. PATENT DOCUMENTS

| | | | |
|---|---|---|---|
| 7,870,363 B2 | 1/2011 | Tang et al. | |
| 8,195,891 B2 | 6/2012 | Trika | |
| 9,690,491 B2 | 6/2017 | Sinclair | |
| 9,703,502 B2 | 7/2017 | Fanning et al. | |
| 9,711,525 B2 | 7/2017 | Jang | |
| 2008/0147968 A1 | 6/2008 | Lee et al. | |
| 2009/0157964 A1* | 6/2009 | Kasorla | G06F 12/0246 711/118 |
| 2012/0198131 A1* | 8/2012 | Tan | G06F 12/0246 711/103 |
| 2013/0024602 A1 | 1/2013 | Sauber et al. | |
| 2014/0164679 A1 | 6/2014 | Manohar et al. | |
| 2016/0188519 A1 | 6/2016 | Wagh et al. | |

FOREIGN PATENT DOCUMENTS

WO 2013101739 A1 7/2013

OTHER PUBLICATIONS

International Search Report and Written Opinion for PCT Patent Application No. PCT/US2017/020257, dated Jun. 14, 2017, 25 pages.

* cited by examiner

*Primary Examiner* — Yong Choe
(74) *Attorney, Agent, or Firm* — Compass IP Law PC

(57) ABSTRACT

A solid state drive includes a controller with a hardware interface to fewer planes of memory cells than included in the nonvolatile storage. For example, a controller hardware interface can include a 1N plane interface coupled to a nonvolatile storage device with 2N planes of memory cells. For data access transactions between the controller and the nonvolatile storage device, first and second consecutive 1N plane command sequences are interpreted as a single 2N plane command sequence.

18 Claims, 6 Drawing Sheets

N PLANE TO 2N PLANE INTERFACE IN A SOLID STATE DRIVE (SSD) ARCHITECTURE

FIELD

The descriptions are generally related to solid state drives, and more particular descriptions are related to an N plane controller interfacing with a 2N plane nonvolatile media.

COPYRIGHT NOTICE/PERMISSION

Portions of the disclosure of this patent document may contain material that is subject to copyright protection. The copyright owner has no objection to the reproduction by anyone of the patent document or the patent disclosure as it appears in the Patent and Trademark Office patent file or records, but otherwise reserves all copyright rights whatsoever. The copyright notice applies to all data as described below, and in the accompanying drawings hereto, as well as to any software described below: Copyright ©2016, Intel Corporation, All Rights Reserved.

BACKGROUND

Solid state nonvolatile storage (e.g., semiconductor circuit based memory cells) continues to improve in performance while dropping in price. Solid state drives (SSDs) now have comparable price points to rotating magnetic disk storage for similar capacities, which continues to expand the penetration of SSDs. Even so, designers continue to make performance improvements in SSD architectures and implementations. SSDs traditionally have memory cells organized as "planes," which refer to resources grouped together and addressed together. Multiple planes enables multiple resources to be accessed in parallel within the SSD.

The push for increasing performance and storage capacity in SSDs has driven an increase in the number of planes of memory cells. It is understood that hardware interfaces to the storage resources provide improved performance over software-based or firmware-based interfaces. However, changes in nonvolatile media, and in particular to the hardware organization of the storage resources into more planes, traditionally requires a corresponding change in the nonvolatile storage controller. Traditionally, manufacturers design a new controller for each new generation of nonvolatile media. However, design and build of the controller tends to require more time than making hardware changes to the nonvolatile media. When the controller is custom-designed for each iteration of nonvolatile media hardware changes, the controller tends to be a bottleneck in product release.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" are to be understood as describing a particular feature, structure, and/or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

Figure 1B:
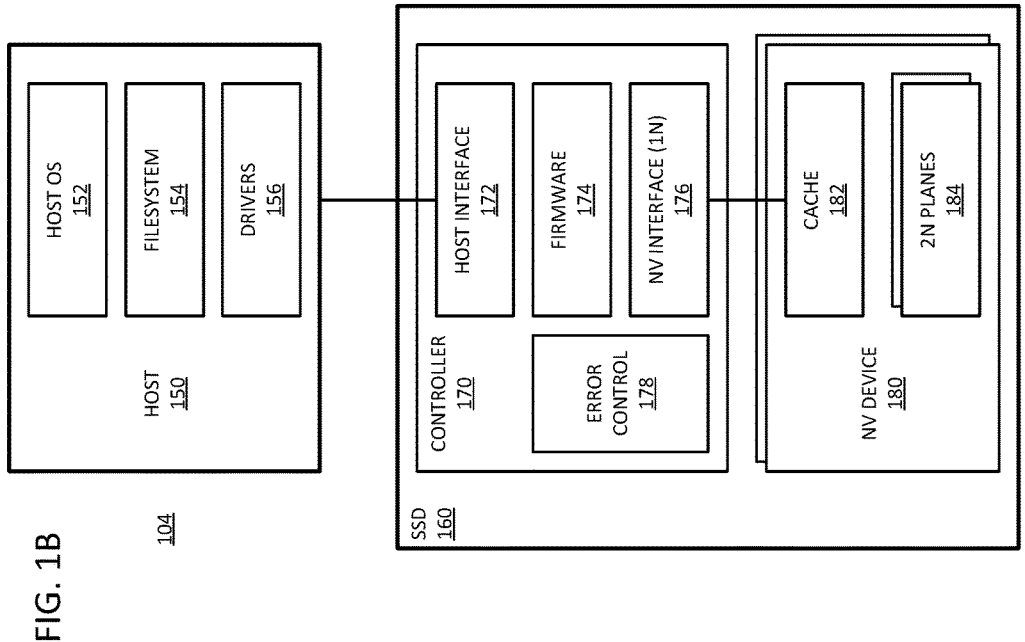
FIG. 1B is a block diagram of an embodiment of a system with a solid state drive (SSD) with a controller with programmable firmware to adjust how it interfaces with storage media having more planes of storage locations than supported in controller hardware.

Descriptions of certain details and implementations follow, including a description of the figures, which may depict some or all of the embodiments described below, as well as discussing other potential embodiments or implementations of the inventive concepts presented herein.

DETAILED DESCRIPTION

As described herein, a solid state drive (SSD) includes a controller with a hardware interface to fewer planes of memory cells than included in the nonvolatile storage. Thus, the controller can interface with nonvolatile storage media that has more planes than supported by the hardware of the controller interface. An SSD includes nonvolatile storage media organized as planes of memory cells, where the planes provide parallel storage access paths. The nonvolatile media is commonly implemented as separate storage die. An SSD also includes a controller with a hardware interface to couple to and access the nonvolatile storage media. Typically, an SSD includes a controller that interfaces with multiple nonvolatile media die.

The controller hardware interface can support interfacing with more planes of nonvolatile storage media by changes to controlling logic, such as firmware or software within the controller. For example, a controller hardware interface can include a 1N plane interface coupled to a nonvolatile storage device with 2N planes of memory cells, where N is an integer. Based on operation of the interface by the controller logic, the controller can interface with the nonvolatile storage media that has more planes. In one embodiment, for data access transactions between the controller and the nonvolatile storage device, first and second consecutive 1N plane command sequences are interpreted as a single 2N plane command sequence.

When a system designer produces nonvolatile media improvements, they are typically incorporated into a new nonvolatile storage device architecture. For example, a new NAND flash memory architecture will generally be created for new NAND solutions. Traditionally the system designer designs the NAND controller from the ground up. A common implementation for a nonvolatile controller is an application specific integrated circuit (ASIC), which can be referred to as a custom controller or custom silicon to interface with the nonvolatile media.

Consider an example of a quad plane architecture NAND flash memory device created to replace legacy NAND SSDs based on dual plane architecture. Such a scenario would traditionally require a new controller ASIC design to improve the sequential write or read throughput. In one embodiment, firmware changes to the controller can enable the use of a legacy dual plane controller to interface with a quad plane memory device. Such an implementation can enable the building of a new SSD without having to wait for the development and deployment of a new controller. In one embodiment, a system designer can match the legacy controller to the new media with less design, with small modifications to controller firmware and modifications to firmware and hardware on the nonvolatile memory device.

Nonvolatile memory refers to memory or storage whose state is determinate even if power is interrupted to the memory. Nonvolatile memory is in contrast to volatile memory whose state (and therefore the data stored on it) is indeterminate if power is interrupted to it. Volatile memory is typically used as system main memory, and traditionally has less capacity than nonvolatile memory, but has much faster access times. A device with nonvolatile media, referring to the hardware resources used to store data, can be referred to as a nonvolatile memory device or storage device.

In one embodiment, the nonvolatile memory device is a block addressable memory device, such as NAND or NOR technologies. A nonvolatile memory device can also include a future generation nonvolatile device, such as a three dimensional crosspoint memory device, or other byte addressable nonvolatile memory devices, or memory devices that use a chalcogenide phase change material (e.g., chalcogenide glass). In one embodiment, the memory device can be or include multi-threshold level NAND flash memory, NOR flash memory, single or multi-level Phase Change Memory (PCM), a resistive memory, nanowire memory, ferroelectric transistor random access memory (FeTRAM), magnetoresistive random access memory (MRAM) memory that incorporates memristor technology, or spin transfer torque (STT)-MRAM, or a combination of any of the above, or other memory.

Figure 1A:
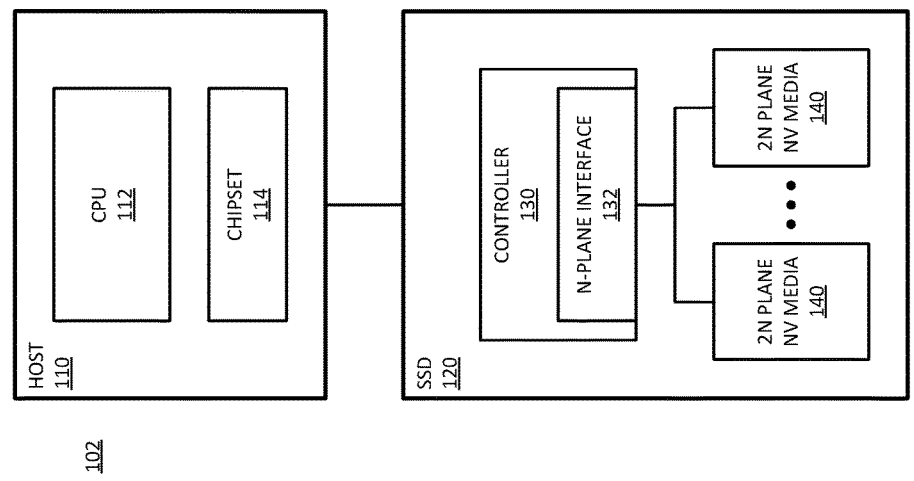
FIG. 1A is a block diagram of an embodiment of a system with a solid state drive (SSD) with a controller that has an interface narrower than the number of planes of storage locations in the SSD.

FIG. 1A is a block diagram of an embodiment of a system with a solid state drive (SSD) with a controller that has an interface narrower than the number of planes of storage locations in the SSD. System 102 includes SSD 120 in accordance with what is described herein, coupled with host 110. Namely, SSD 120 includes controller 130 that has a hardware interface for N planes, and includes nonvolatile media (NV media) 140 having 2N planes.

Host 110 represents a host hardware platform that connects to SSD 120. Host 110 includes CPU (central processing unit) 112 and/or other processor. CPU 112 represents any host processor that generates requests to access data stored on 120, either to read the data and/or to write data to the storage. Such a processor can include a single or multicore processor, a primary processor for a computing device, a graphics processor, a peripheral processor, and/or a supplemental or auxiliary processor. CPU 112 can execute a host operating system (OS) and/or other applications to cause the operation of system 102. Host 110 also includes chipset 114, which represents other hardware components that can be included in connecting between CPU 112 and SSD 120. For example, chipset 114 can include drivers and other logic or circuitry to provide access to SSD 120. In one embodiment, chipset 114 includes a storage controller, which is a host-side controller that is separate from controller 130 within SSD 120.

SSD 120 represents a solid state drive that includes NV media 140 to store data. SSD 120 also includes controller 130 to control access to NV media 140. Controller 130 includes N plane interface 132, which includes hardware to interface with an N plane nonvolatile storage device. Traditionally, controller 130 and NV media 140 are developed on different process technologies. Since they are developed on different processes, each is developed independently in time. In one embodiment, controller 130 represents an ASIC controller. ASIC development on a traditional SSD is long process. However, instead of an N plane nonvolatile storage, SSD 120 includes 2N plane NV media 140. Thus, system 102 can leverage the design of a legacy controller to interface with new nonvolatile media. In one embodiment, leveraging the design of the legacy controller can include modifications to the design to dramatically reduce the scope of controller design (e.g., reduce the amount of work needed to design a new ASIC).

In one embodiment, SSD 120 includes quad plane NV media 140 (2N plane count, where N equals 2) and a dual plane (N plane count) controller 130. Enabling the use of an N plane controller with a 2N plane NV media provides the opportunity to reduce platform cost, and provides equal performance with one half the NV media devices 140 for a given SSD density without changing the controller hardware. With such a design, system 102 can maintain the same sequential write performance of previous generation SSD solutions. Controller 130 has command sequences for reading and writing to the memory cells of NV media 140. The number of planes represents the width of the data.

In one embodiment, controller 130 includes an interface to NV media 140 (e.g., a south bridge), and includes an interface to host 110 (e.g., a north bridge). Interface 132 is an interface for reading, writing, and otherwise accessing NV media 140. Interface 132 includes hardware to control sequences of commands to NV media 140. In one embodiment, commands to NV media 140 can include a write command from controller 130. In one embodiment, controller 130 stitches together two N plane (or 1N plane) command sequences as a single 2N command sequence. NV media 140 interprets the two 1N plane command sequences as a single 2N plane command sequence. In one embodiment, commands to NV media 140 can include a read command from controller 130. In one embodiment, NV media 140 provides a 2N read sequence to controller 130, which the controller receives and decodes as two 1N read sequences.

FIG. 1B is a block diagram of an embodiment of a system with a solid state drive (SSD) with a controller with programmable firmware to adjust how it interfaces with storage media having more planes of storage locations than supported in controller hardware. System 104 provides one example of a system in accordance with system 102 of FIG. 1A. Whereas system 102 illustrates the hardware platform of the host and the SSD, system 104 illustrates the logical layers of the host and SSD. In one embodiment, host 150 provides one example of host 110. In one embodiment, SSD 160 provides one example of SSD 120.

In one embodiment, host 150 includes host OS 152, which represents a host operating system or software platform for the host. Host OS 152 can include a platform on which applications, services, agents, and/or other software executes. Filesystem 154 represents control logic for controlling access to the NV media. Filesystem 154 can manage what addresses or memory locations are used to store what data. There are numerous filesystems known, and filesystem 154 can implement known filesystems or other proprietary systems. In one embodiment, filesystem 154 is part of host OS 152. Drivers 156 represent system-level modules that control hardware. In one embodiment, drivers 156 include a software application to control the hardware of SSD 160.

Controller 170 of SSD 160 includes firmware 174, which represents control software/firmware for the controller. In one embodiment, controller 170 includes host interface 172, which represents an interface to host 150. In one embodiment, controller 170 includes NV interface 176, which represents an interface to NV device(s) 180. It will be understood that controller 170 includes hardware to interface with host 150 (not specifically shown), which can be considered to be controlled by host interface software/firmware 172. Likewise, it will be understood that controller 170 includes hardware to interface with NV device 180 (with N plane interface 132 of system 102 representing one example). In one embodiment, code for host interface 172 can be part of firmware 174. In one embodiment, code for NV interface 176 can be part of firmware 174.

Firmware 174 controls the hardware interfaces to enable communication. In one embodiment, firmware 174 can be modified to enable controller 170 to interface with NV devices 180 that have more planes than the hardware interface of controller 170 is designed to interface. In one embodiment, NV interface 176 and/or firmware 174 provides a series of command sequences to NV device 180 as a single command. Thus, controller 170 can include changed command sequences relative to legacy SSD implementations. Controller 170 can be considered to stitch multiple command sequences together into a longer sequence of commands.

It will be understood that more hardware implementation within controller 170 will increase the speed of operation of the SSD. Thus, command sequences can be implemented in firmware (e.g., firmware 174 and/or NV interface 176), but firmware is generally slower than hardware. Firmware is more flexible because it can perform more operations and be modified, but hardware is generally much faster than firmware implementations. It will be understood that there are aspects of interaction that are handled in firmware in all cases, seeing that the firmware controls the hardware. However, firmware implementation refers to an implementation in which all sequencing and all processing of signals is performed in firmware controlled logic. A hardware implementation includes hardware processing of at least some of the signal exchanges. Firmware control over the hardware needs to be compatible with both the hardware interface of controller 170, as well as the hardware and firmware of NV device 180.

An example of hardware versus firmware can be represented by error control 178. Error control 178 handles data errors in accessed data, and corner cases in terms of compliance with signaling and communication interfacing. It is possible to implement at least some of error control in hardware. However, most error control is implemented in firmware for the flexibility, even if it is slower than a hardware implementation. A hardware implementation may require an impractical amount of hardware logic to implement. Similarly, in one embodiment, firmware 174 handles erase operations and drive cleanup procedures.

NV device 180 represents a nonvolatile device in accordance with any embodiment described herein. In one embodiment, NV device 180 includes cache 182, which represents an input and/or output buffer or cache to store temporary data for exchange with controller 170. The use of cache 182 can enable NV device 180 to receive commands asynchronously, and still operate on and respond to the command synchronously. The timing can be made synchronous by buffering the data in cache 182. In one embodiment, NV device 180 includes 2N planes while NV interface 176 of controller 170 includes a 1N interface. While specific reference and specific examples mention and describe the application of a 1N to 2N interface between controller 170 and NV devices 180, it will be understood that another ratio other than 1:2 can be accommodated in a similar way as what is described herein.

In one embodiment, controller 170 changes command sequencing to NV devices 180 to support NV devices with more planes than are natively supported by the hardware of controller 170. Firmware modifications to controller 170 can support such command sequencing changes, by changing how controller operates it hardware.

Figure 2:
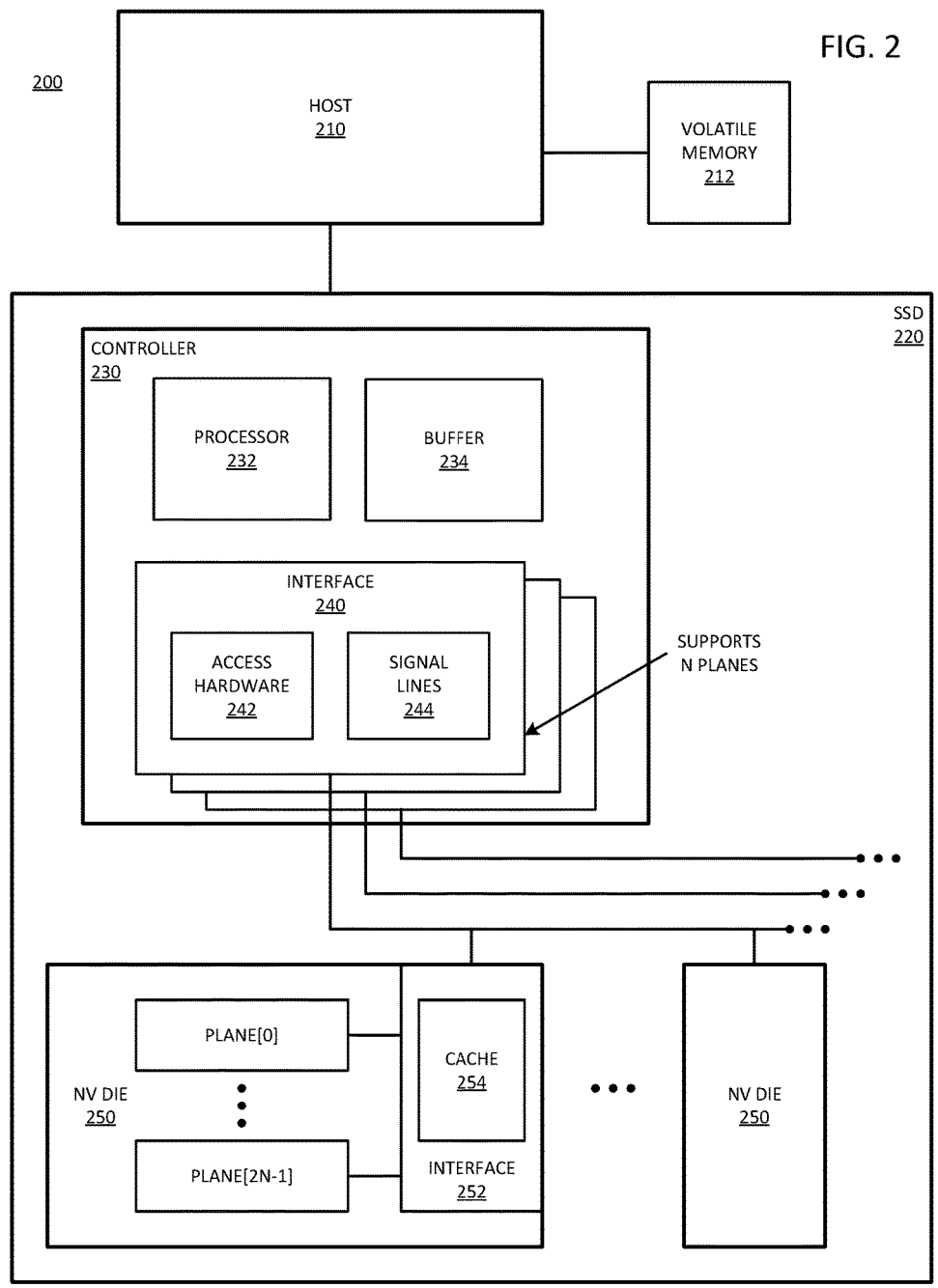
FIG. 2 is a block diagram of an embodiment of a system with a controller in a solid state drive (SSD) that couples to multiple nonvolatile media die.

FIG. 2 is a block diagram of an embodiment of a system with a controller in a solid state drive (SSD) that couples to multiple nonvolatile media die. System 200 provides one example of an embodiment of a computing system in accordance with system 102 of FIG. 1A and/or system 104 of FIG. 1B. Host 210 represents a host hardware and software platform. Host 210 generates requests for data, which requests result in data access operations to SSD 220. Host 210 can include a storage controller that controls access from host 210 to SSD 220. Such a storage controller can be distinguished from controller 230 of SSD 220. Controller 230 represents a controller on SSD 220 to manage incoming requests for data access from host 210.

In one embodiment, system 200 includes volatile memory 212, which represents volatile memory that host 210 can access for temporary storage of data. For example, memory 212 can be considered an operating memory of system 200, while SSD 220 can include storage that is not directly executed by host 210. In one embodiment, all data and code for execution by host is first loaded from SSD 220 to memory 212. In one embodiment, host 210 directly executes code and/or data from SSD 220, for example, by loading data into a cache (not explicitly shown). While not specifically shown, in one embodiment, SSD 220 is coupled to memory 212, and can transfer data to and/or from memory 212, such as loading a program for execution by a host processor, writing data generated by a host application, or other action.

In one embodiment, controller 230 is a custom device (e.g., an ASIC), which includes processor 232, buffer 234, and one or more NV storage interfaces 240. Processor 232 represents a microprocessor or microcontroller or other processing logic on controller 230 that enables controller 230 to execute operations related to processing incoming requests and access the nonvolatile media in response to the requests. It will be understood that processor 232 is separate from a processor included in host 210 as part of the host hardware platform. Buffer 234 represents a buffer or cache within controller 230 that enables SSD 220 to receive and buffer multiple requests or instructions and/or write data from host 210. Buffer 234 can also represent a buffer or cache to buffer data to be output to host 210 (e.g., read data). In one embodiment, controller 230 includes separate ingress and egress buffers 234.

Interface 240 represents hardware and software/firmware within controller 230 to enable access to NV die 250. In one embodiment, each interface 240 supports an interface to N planes, where N is an integer. In one embodiment, each NV die 250 includes 2N planes (e.g., plane[0]-plane[2N−1]). NV die 250 represent NV media in accordance with any embodiment described herein. The 2N planes enable parallel access to multiple memory cells concurrently. Interface 252 represents a hardware interface, which can be controlled by software/firmware on the NV media itself, which interfaces with controller 230.

In one embodiment, controller 230 includes multiple interfaces 240, each of which can connect to multiple NV die 250. Each NV die 250 includes 2N planes, and includes interface 252 to couple to a corresponding interface 240 of controller 230. In one embodiment, interface 254 includes cache 254 to store received requests and write data, and/or to store read data. In one embodiment, processor 232 executes firmware to control interfaces 240 to support connections to NV die 250 that have 2N planes of memory cells, even though interfaces 240 are N plane interfaces.

Interfaces 240 include access hardware 242, which represents hardware drivers and interface circuits to generate and receive signals with NV die 250. Access hardware 242 can include processing hardware to support the processing of data exchanges between controller 230 and the NV media. Signal lines 244 can in one embodiment be considered access hardware 242. Signal lines 244 are illustrated to represent that SSD 220 includes one or more physical buses from interface 240 to NV die 250. Signal exchanges between controller 230 and NV die 250 operate within a width of the bus (which can be referred to as bandwidth or number of signal lines). Based on the number of signal lines 244, controller 230 can be configured in hardware to support N planes. In one embodiment, controller firmware of controller 230 changes sequencing of commands to support 2N planes of NV media.

In one embodiment, for write data from controller 230 to NV die 250, controller 230 can cause interface to treat multiple consecutive commands as a single command. Thus, multiple 1N commands can be understood as a single multi-N command, such as a 2N command. For read data from NV die 250 to controller 230, in one embodiment, NV die 250 generates two 1N plane command sequences internally to transfer 2N planes of data that the NV media could otherwise transfer as a single 2N plane read sequence. In one embodiment, NV die 250 transfers a single 2N plane read sequence, which controller 230 can be modified to accept and interpret as two 1N plane read sequences. In both cases, either controller 230 or NV die 250 or both make internal changes to how they transfer data to support the mismatch in the interface between the controller and the media.

Figure 3:
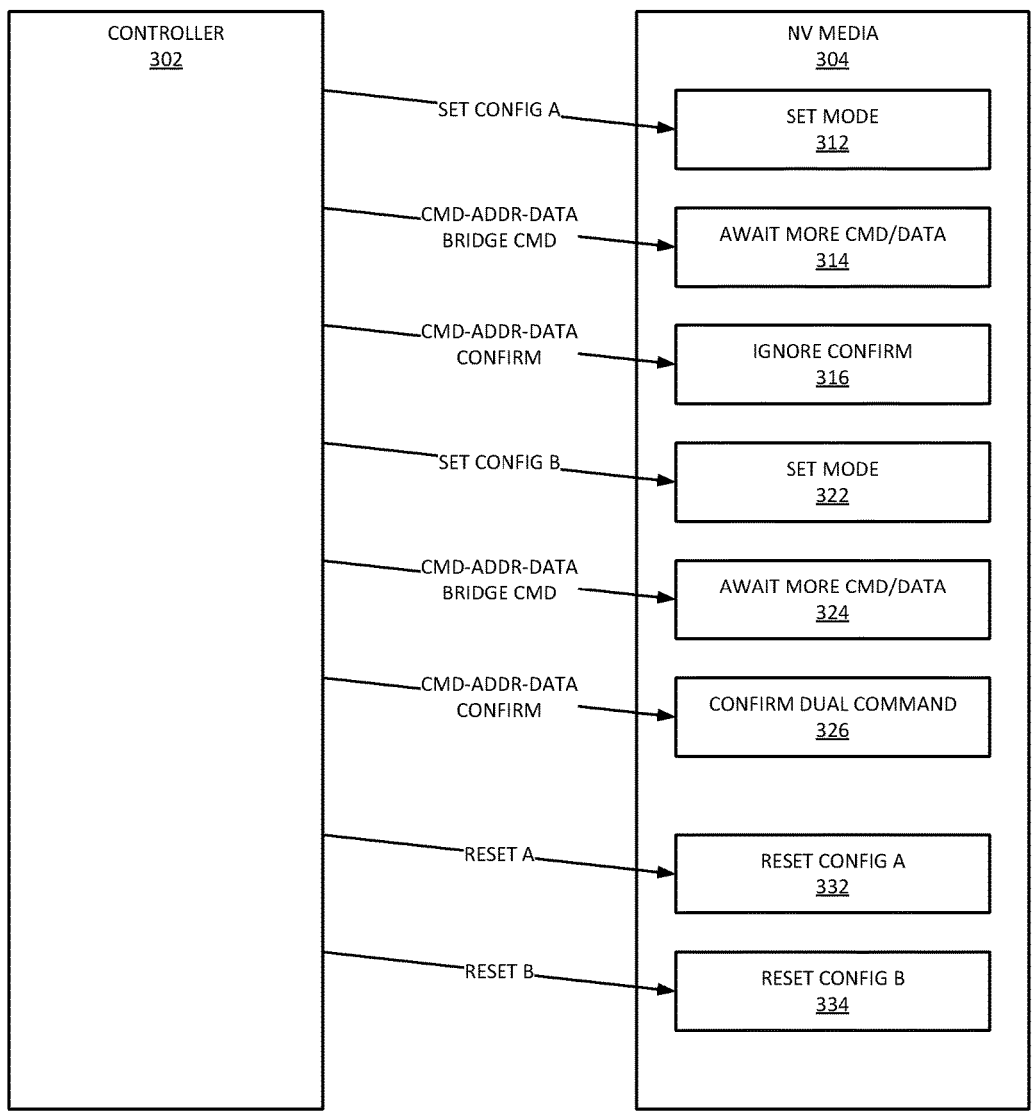
FIG. 3 is a block diagram illustrating an embodiment of an exchange between a controller and nonvolatile media to provide 2N worth of data from a 1N controller.

FIG. 3 is a block diagram illustrating an embodiment of an exchange between a controller and nonvolatile media to provide 2N worth of data from a 1N controller. Sequence 300 provides one example of an embodiment of a write access operation from controller 302 to NV media 304 in accordance with any embodiment described herein. In one embodiment, sequence 300 illustrates a write operation or write transaction in accordance with modified firmware at controller 302 and modified firmware in NV media 304. NV media 304 can also include hardware changes to support interfacing with controller 302 that supports fewer planes than included within NV media 304. Sequence 300 can enable full write bandwidth for new NV media from a legacy controller.

In one embodiment, controller 302 first sets a configuration of NV media 304, setting configuration "A." Configuration A can be understood by NV media 304 as indicating a number of planes supported by NV media 304. In response to the configuration setting, in one embodiment, NV media 304 sets a mode of operation, 312, or sets the configuration. Based on the configuration, NV media 304 may interpret incoming requests differently.

In one embodiment, while NV media 304 operates in configuration A, controller 302 sends a command sequence with a bridge command, in response to which NV media 304 awaits more commands and/or data, 314. An example of a write command sequence can include the following opcode sequence: 80h-<Address>-<Data>-11h, where opcode "80h" represents a write command, and opcode "11h" represents a bridge command, meaning NV media 304 should expect more address and data information before confirming and executing the command.

Controller 302 can subsequently send another sequence of commands, address, and data, in response to which NV media 304 can ignore a confirmation or execution command. For example, the sequence can include the following opcode sequence: 80h-<Address>-<Data>-10h, where opcode "80h" represents the next write command, and opcode "10h" represents a confirm command or an execute command, meaning NV media 304 should execute and confirm the command sequence. Traditionally, in response to opcode 10h, NV media 304 would execute the command sequence, writing the first data and the second data. However, based on the setting to configuration A, NV media 304 ignores the confirm command, 316.

Sequence 300 sets out the commands as illustrated to make the point that each command sequence of write code, address, data, and end code could be understood as a command sequence. In sequence 300, the combination of the first and second sequences is one command sequence for a dual plane architecture. Such a dual plane command sequence is understood by the bridge command after the first address and data elements, and the confirm command after the second address and data elements. In a quad plane command sequence, additional bridge commands could be placed after write code, address, and data elements until four elements of address and data are transferred. However, controller 302 does not support a quad plane interface, and instead sends out two command, address, and data units in one configuration to cause NV media 304 to ignore the first confirm command.

In one embodiment, controller 302 sets configuration "B" for NV media 304, in response to which NV media 304 sets the corresponding mode or configuration, 322. In one embodiment, setting the configuration of NV media 304 first to A and subsequently to B informs the NV media that the architecture is a 2N architecture (quad plane as illustrated).

In one embodiment, while NV media 304 operates in configuration B, controller 302 sends a command sequence with a bridge command, in response to which NV media 304 awaits more commands and/or data, 324. An example of the write command sequence can include the following opcode sequence: 80h-<Address>-<Data>-11h. Similarly, to what is described above, controller 302 can subsequently send another sequence of commands, address, and data, in response to which NV media 304 confirm the dual command, 326, referring to the two 1N plane sequences. For example, the sequence can include the following opcode sequence: 80h-<Address>-<Data>-10h, after which NV media 304 executes and confirms the entire command sequence.

In one embodiment, controller 302 sends a command to reset configuration A, in response to which NV media 304 can reset the configuration, 332. In one embodiment, controller 302 separately sends a command to reset configuration B, in response to which NV media 304 can reset the second configuration, 334. In one embodiment, configuration A provides the function to cause NV media 304 to ignore the first confirm or execute command. In one embodiment, in response to the first sequence of commands, NV media 304 ignores the first confirm command, 316 and sets up planes 0 and 1 for programming. In response to the configuration to B, NV media 304 knows that the command sequence is a quad plane program. Thus, NV media 304 can configure planes 2 and 3 for programming, and set the trims according to the entire command sequence for a quad plane programming operation.

As illustrated, controller 302 sends first and second configuration settings, which cause NV media 304 to enter the specified configurations. Each configuration is separately cleared. In an alternate embodiment, the system can be configured to allow for self-clearing configurations. For example, controller 302 can set configuration A, which NV media 304 can clear in response to receiving the first confirm command. In one embodiment, NV media 304 can also automatically switch to configuration B in response to the first confirm command. Then the NV media can default into confirming the second command sequence sent by controller 302. Thus, the illustrated example is meant only as one example, and is not limiting. It will be understood that other sequences of setting the configuration can be used.

Figure 4:
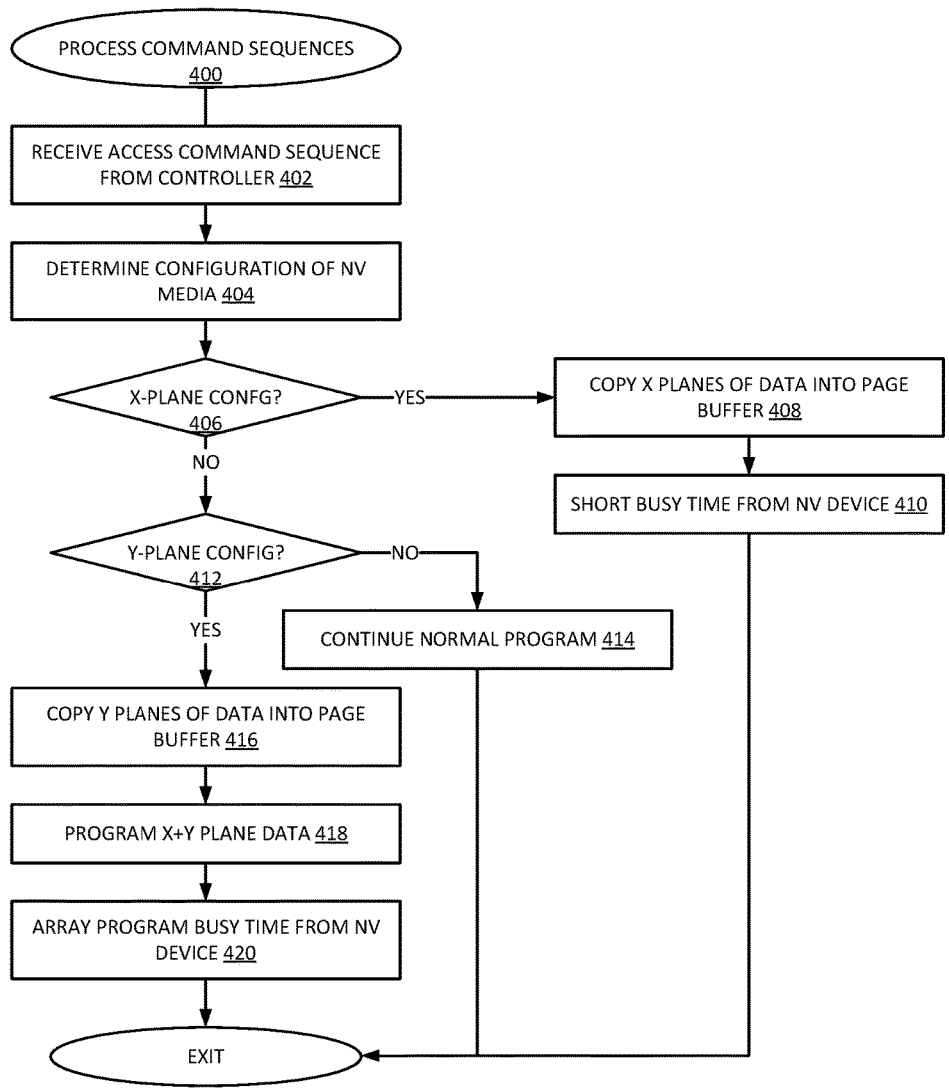
FIG. 4 is a flow diagram of an embodiment of a process for receiving command sequences at a nonvolatile medium from a controller.

FIG. 4 is a flow diagram of an embodiment of a process for receiving command sequences at a nonvolatile medium from a controller. Process 400 illustrates one example of processing received command sequences at a nonvolatile device having 2N planes from a controller having an interface for 1N planes. Process 400 can be executed by a nonvolatile media device in accordance with an embodiment described herein.

In one embodiment, the NV device receives an access command sequence from the controller, 402. Sequence 300 illustrates one example of a command sequence where the controller sends a command sequence to the NV device. In one embodiment, in response to the received command sequence, the NV device determines its configuration, 404. If the NV device is in X plane configuration, 406 YES branch, in one embodiment the NV device copies X planes of data into an input page buffer (such as buffer 234 of system 200), and provides a short busy time from the NV device, 410. The short busy time is because the NV device does not execute and confirm the command. In one embodiment, the NV device can exit the process to await another command.

In one embodiment, if the NV device is not in X plane configuration, 406 NO branch, the NV device determines if it is in Y plane configuration, 412. If the NV device is not in Y plane configuration, 412 NO branch, in one embodiment the NV device continues with a normal program, 414. Thus, the NV device can determine if it is in a special configuration mode, or if it is connected to a controller that has the same interface as it has (e.g., an interface to the number of planes included in the NV media).

In one embodiment, if the NV device is in Y plane configuration, 412 YES branch, the NV device copies Y planes of data into the page buffer, 416. In one embodiment, the NV device then responds to an execute opcode and programs the X plus Y plane data into the NV media, 418. Due to the fact that the NV device is programming the data, the NV media array will be busy for a program time, 420. The NV device can thus interpret consecutive N plane command sequences as a single 2N plane command sequence.

Figure 5:
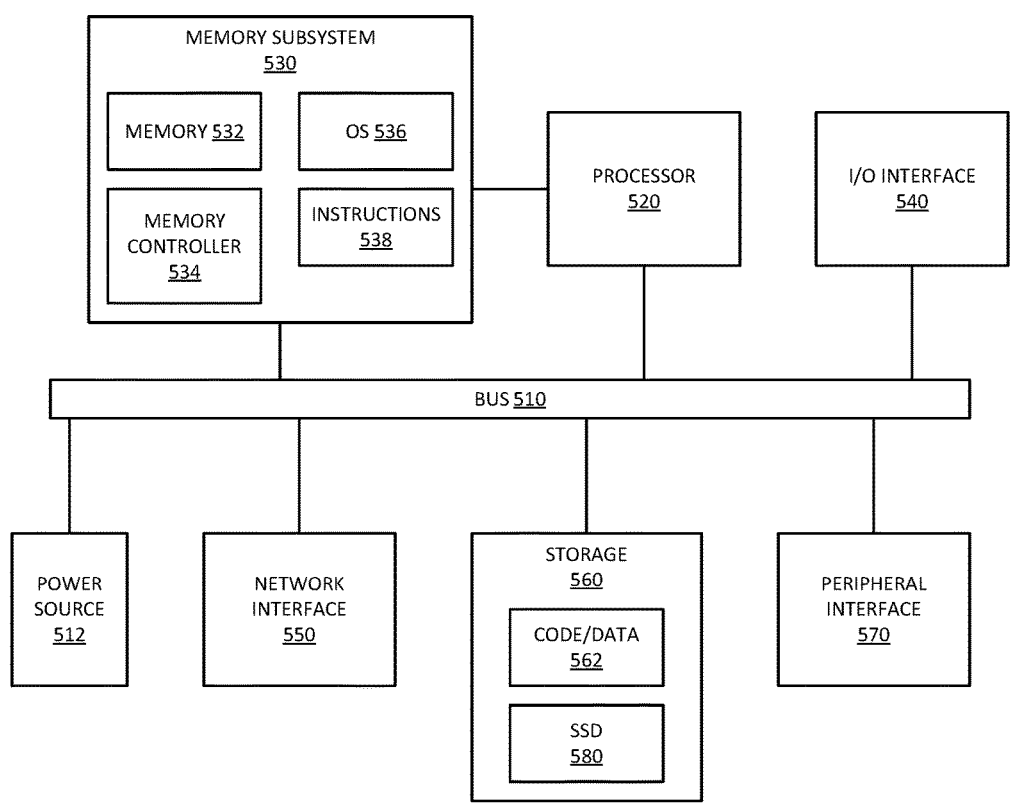
FIG. 5 is a block diagram of an embodiment of a computing system in which an SSD having an N plane controller and a 2N plane nonvolatile media can be implemented.

FIG. 5 is a block diagram of an embodiment of a computing system in which an SSD having an N plane controller and a 2N plane nonvolatile media can be implemented. System 500 represents a computing device in accordance with any embodiment described herein, and can be a laptop computer, a desktop computer, a server, a gaming or entertainment control system, a scanner, copier, printer, routing or switching device, or other electronic device. System 500 includes processor 520, which provides processing, operation management, and execution of instructions for system 500. Processor 520 can include any type of microprocessor, central processing unit (CPU), processing core, or other processing hardware to provide processing for system 500. Processor 520 controls the overall operation of system 500, and can be or include, one or more programmable general-purpose or special-purpose microprocessors, digital signal processors (DSPs), programmable controllers, application specific integrated circuits (ASICs), programmable logic devices (PLDs), or the like, or a combination of such devices. Processor 520 can execute data stored in memory 532 and/or write or edit data stored in memory 532.

Memory subsystem 530 represents the main memory of system 500, and provides temporary storage for code to be executed by processor 520, or data values to be used in executing a routine. Memory subsystem 530 can include one or more memory devices such as read-only memory (ROM), flash memory, one or more varieties of random access memory (RAM), or other memory devices, or a combination of such devices. Memory subsystem 530 stores and hosts, among other things, operating system (OS) 536 to provide a software platform for execution of instructions in system 500. Additionally, other instructions 538 are stored and executed from memory subsystem 530 to provide the logic and the processing of system 500. OS 536 and instructions 538 are executed by processor 520. Memory subsystem 530 includes memory device 532 where it stores data, instructions, programs, or other items. In one embodiment, memory subsystem includes memory controller 534, which is a memory controller to generate and issue commands to memory device 532. It will be understood that memory controller 534 could be a physical part of processor 520.

Processor 520 and memory subsystem 530 are coupled to bus/bus system 510. Bus 510 is an abstraction that represents any one or more separate physical buses, communication lines/interfaces, and/or point-to-point connections, connected by appropriate bridges, adapters, and/or controllers. Therefore, bus 510 can include, for example, one or more of a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (commonly referred to as "Firewire"). The buses of bus 510 can also correspond to interfaces in network interface 550.

Power source 512 couples to bus 510 to provide power to the components of system 500. In one embodiment, power source 512 includes an AC to DC (alternating current to direct current) adapter to plug into a wall outlet. Such AC power can be renewable energy (e.g., solar power). In one embodiment, power source 512 includes only DC power, which can be provided by a DC power source, such as an external AC to DC converter. In one embodiment, power source 512 includes wireless charging hardware to charge via proximity to a charging field. In one embodiment, power source 512 can include an internal battery or fuel cell source.

System 500 also includes one or more input/output (I/O) interface(s) 540, network interface 550, one or more internal mass storage device(s) 560, and peripheral interface 570 coupled to bus 510. I/O interface 540 can include one or more interface components through which a user interacts with system 500 (e.g., video, audio, and/or alphanumeric interfacing). In one embodiment, I/O interface 540 generates a display based on data stored in memory and/or operations executed by processor 520. Network interface 550 provides system 500 the ability to communicate with remote devices (e.g., servers, other computing devices) over one or more networks. Network interface 550 can include an Ethernet adapter, wireless interconnection components, USB (universal serial bus), or other wired or wireless standards-based or proprietary interfaces. Network interface 550 can exchange data with a remote device, which can include sending data stored in memory and/or receive data to be stored in memory.

Storage 560 can be or include any conventional medium for storing large amounts of data in a nonvolatile manner, such as one or more magnetic, solid state, or optical based disks, or a combination. Storage 560 holds code or instructions and data 562 in a persistent state (i.e., the value is retained despite interruption of power to system 500). Storage 560 can be generically considered to be a "memory," although memory 530 is the executing or operating memory to provide instructions to processor 520. Whereas storage 560 is nonvolatile, memory 530 can include volatile memory (i.e., the value or state of the data is indeterminate if power is interrupted to system 500).

Peripheral interface 570 can include any hardware interface not specifically mentioned above. Peripherals refer generally to devices that connect dependently to system 500. A dependent connection is one where system 500 provides the software and/or hardware platform on which operation executes, and with which a user interacts.

In one embodiment, system 500 includes SSD 580, which can be an SSD in accordance with any embodiment described herein. SSD 580 includes a controller with an interface to N planes, and includes NV devices (e.g., an NV die or chip or other device) that includes 2N planes. The controller exchanges 2 separate N plane command sequences to access the 2N planes of the NV media, in accordance with what is described above.

Figure 6:
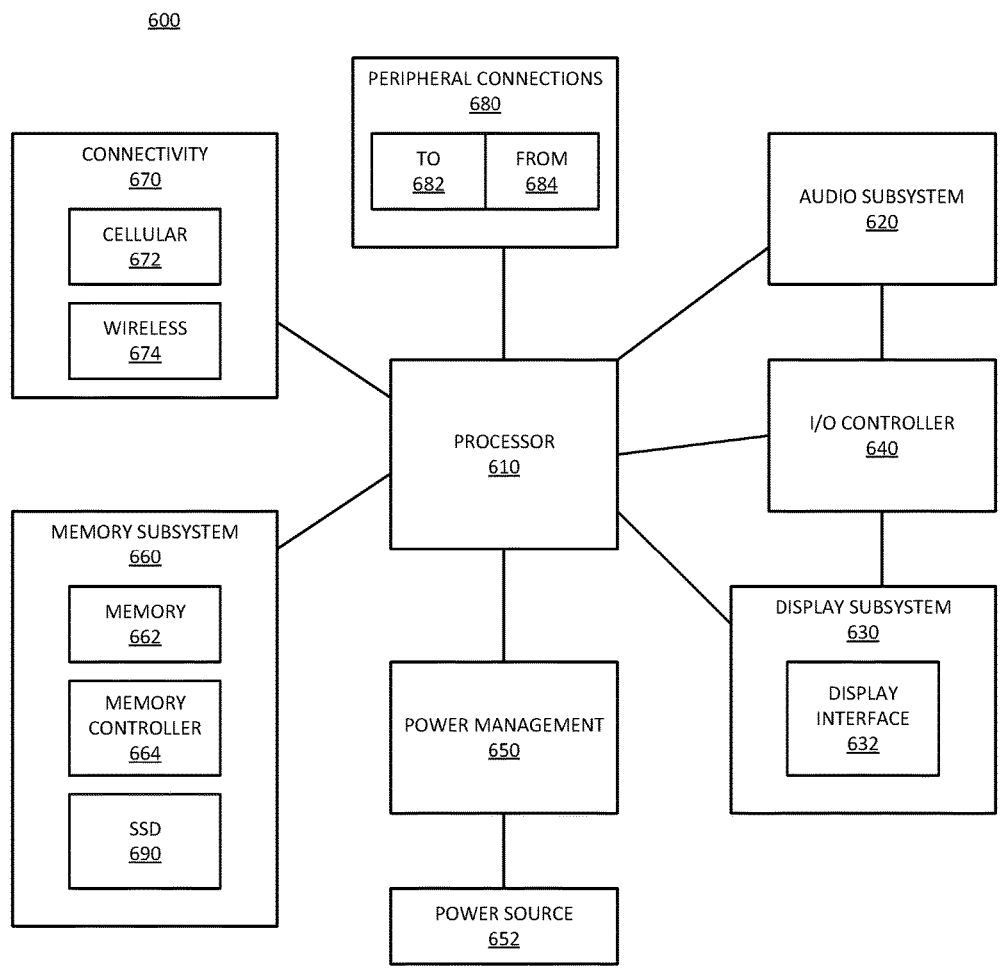
FIG. 6 is a block diagram of an embodiment of a mobile device in which an SSD having an N plane controller and a 2N plane nonvolatile media can be implemented.

FIG. 6 is a block diagram of an embodiment of a mobile device in which an SSD having an N plane controller and a 2N plane nonvolatile media can be implemented. Device 600 represents a mobile computing device, such as a computing tablet, a mobile phone or smartphone, a wireless-enabled e-reader, wearable computing device, or other mobile device. It will be understood that certain of the components are shown generally, and not all components of such a device are shown in device 600.

Device 600 includes processor 610, which performs the primary processing operations of device 600. Processor 610 can include one or more physical devices, such as microprocessors, application processors, microcontrollers, programmable logic devices, or other processing means. The processing operations performed by processor 610 include the execution of an operating platform or operating system on which applications and/or device functions are executed. The processing operations include operations related to I/O (input/output) with a human user or with other devices, operations related to power management, and/or operations related to connecting device 600 to another device. The processing operations can also include operations related to audio I/O and/or display I/O. Processor 610 can execute data stored in memory and/or write or edit data stored in memory.

In one embodiment, device 600 includes audio subsystem 620, which represents hardware (e.g., audio hardware and audio circuits) and software (e.g., drivers, codecs) components associated with providing audio functions to the computing device. Audio functions can include speaker and/or headphone output, as well as microphone input. Devices for such functions can be integrated into device 600, or connected to device 600. In one embodiment, a user interacts with device 600 by providing audio commands that are received and processed by processor 610.

Display subsystem 630 represents hardware (e.g., display devices) and software (e.g., drivers) components that provide a visual and/or tactile display for a user to interact with the computing device. Display subsystem 630 includes display interface 632, which includes the particular screen or hardware device used to provide a display to a user. In one embodiment, display interface 632 includes logic separate from processor 610 to perform at least some processing related to the display. In one embodiment, display subsystem 630 includes a touchscreen device that provides both output and input to a user. In one embodiment, display subsystem 630 includes a high definition (HD) display that provides an output to a user. High definition can refer to a display having a pixel density of approximately 60 PPI (pixels per inch) or greater, and can include formats such as full HD (e.g., 680p), retina displays, 4K (ultra high definition or UHD), or others. In one embodiment, display subsystem 630 generates display information based on data stored in memory and/or operations executed by processor 610.

I/O controller 640 represents hardware devices and software components related to interaction with a user. I/O controller 640 can operate to manage hardware that is part of audio subsystem 620 and/or display subsystem 630. Additionally, I/O controller 640 illustrates a connection point for additional devices that connect to device 600 through which a user might interact with the system. For example, devices that can be attached to device 600 might include microphone devices, speaker or stereo systems, video systems or other display device, keyboard or keypad devices, or other I/O devices for use with specific applications such as card readers or other devices.

As mentioned above, I/O controller 640 can interact with audio subsystem 620 and/or display subsystem 630. For example, input through a microphone or other audio device can provide input or commands for one or more applications or functions of device 600. Additionally, audio output can be provided instead of or in addition to display output. In another example, if display subsystem includes a touchscreen, the display device also acts as an input device, which can be at least partially managed by I/O controller 640. There can also be additional buttons or switches on device 600 to provide I/O functions managed by I/O controller 640.

In one embodiment, I/O controller 640 manages devices such as accelerometers, cameras, light sensors or other environmental sensors, gyroscopes, global positioning system (GPS), or other hardware that can be included in device 600. The input can be part of direct user interaction, as well as providing environmental input to the system to influence its operations (such as filtering for noise, adjusting displays for brightness detection, applying a flash for a camera, or other features).

In one embodiment, device 600 includes power management 650 that manages battery power usage, charging of the battery, and features related to power saving operation. Power management 650 manages power from power source 652, which provides power to the components of system 600. In one embodiment, power source 652 includes an AC to DC (alternating current to direct current) adapter to plug into a wall outlet. Such AC power can be renewable energy (e.g., solar power). In one embodiment, power source 652 includes only DC power, which can be provided by a DC power source, such as an external AC to DC converter. In one embodiment, power source 652 includes wireless charging hardware to charge via proximity to a charging field. In one embodiment, power source 652 can include an internal battery or fuel cell source.

Memory subsystem 660 includes memory device(s) 662 for storing information in device 600. Memory subsystem 660 can include nonvolatile (state does not change if power to the memory device is interrupted) and/or volatile (state is indeterminate if power to the memory device is interrupted) memory devices. Memory 660 can store application data, user data, music, photos, documents, or other data, as well as system data (whether long-term or temporary) related to the execution of the applications and functions of system 600. In one embodiment, memory subsystem 660 includes memory controller 664 (which could also be considered part of the control of system 600, and could potentially be considered part of processor 610). Memory controller 664 includes a scheduler to generate and issue commands to memory device 662.

Connectivity 670 includes hardware devices (e.g., wireless and/or wired connectors and communication hardware) and software components (e.g., drivers, protocol stacks) to enable device 600 to communicate with external devices. The external device could be separate devices, such as other computing devices, wireless access points or base stations, as well as peripherals such as headsets, printers, or other devices. In one embodiment, system 600 exchanges data with an external device for storage in memory and/or for display on a display device. The exchanged data can include data to be stored in memory and/or data already stored in memory, to read, write, or edit data.

Connectivity 670 can include multiple different types of connectivity. To generalize, device 600 is illustrated with cellular connectivity 672 and wireless connectivity 674. Cellular connectivity 672 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, LTE (long term evolution—also referred to as "4G"), or other cellular service standards. Wireless connectivity 674 refers to wireless connectivity that is not cellular, and can include personal area networks (such as Bluetooth), local area networks (such as WiFi), and/or wide area networks (such as WiMax), or other wireless communication. Wireless communication refers to transfer of data through the use of modulated electromagnetic radiation through a non-solid medium. Wired communication occurs through a solid communication medium.

Peripheral connections 680 include hardware interfaces and connectors, as well as software components (e.g., drivers, protocol stacks) to make peripheral connections. It will be understood that device 600 could both be a peripheral device ("to" 682) to other computing devices, as well as have peripheral devices ("from" 684) connected to it. Device 600 commonly has a "docking" connector to connect to other computing devices for purposes such as managing (e.g., downloading and/or uploading, changing, synchronizing) content on device 600. Additionally, a docking connector can allow device 600 to connect to certain peripherals that allow device 600 to control content output, for example, to audiovisual or other systems.

In addition to a proprietary docking connector or other proprietary connection hardware, device 600 can make peripheral connections 680 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other type.

In one embodiment, system 600 includes SSD 690, which can be an SSD in accordance with any embodiment described herein. SSD 690 includes a controller with an interface to N planes, and includes NV devices (e.g., an NV die or chip or other device) that includes 2N planes. The controller exchanges 2 separate N plane command sequences to access the 2N planes of the NV media, in accordance with what is described above.

In one aspect, a solid state drive includes: a nonvolatile storage device including a number 2N of planes of memory cells; and a controller including a 1N plane hardware interface coupled to the nonvolatile storage device; wherein a data access transaction between the controller and the nonvolatile storage device includes first and second consecutive 1N plane command sequences interpreted as a single 2N plane command sequence.

In one embodiment, the nonvolatile storage device comprises a quad-plane storage device, and wherein the controller includes a dual-plane hardware interface. In one embodiment, the data access transaction comprises a write from the controller to the nonvolatile storage device. In one embodiment, further comprising the controller to set the nonvolatile storage device to a first configuration prior to the first command sequence, and to set the nonvolatile storage device to a second configuration between the first command sequence and the second command sequence. In one embodiment, further comprising the nonvolatile storage device to ignore a first execute command associated with the first command sequence, and to execute the first and second command sequences in response to a second execute command associated with the second command sequence. In one embodiment, the execute command comprises a confirm command. In one embodiment, the data access transaction comprises a read from the nonvolatile storage device to the controller. In one embodiment, further comprising the nonvolatile storage device to generate two 1N plane command sequences to transfer 2N planes of data to the controller. In one embodiment, further comprising the nonvolatile storage device to send a 2N plane command sequence, which the controller interprets as two 1N plane command sequences.

In one aspect, a computing system includes: a multicore processor to execute instructions; a volatile memory device to store data to be executed by the processor; and a solid state drive coupled to the processor and the volatile memory device, the solid state drive including a nonvolatile storage device including a number 2N of planes of memory cells; and a controller including a 1N plane hardware interface coupled to the nonvolatile storage device; wherein a data access transaction between the controller and the nonvolatile storage device includes first and second consecutive 1N plane command sequences interpreted as a single 2N plane command sequence. The computing system can include any embodiment of a solid state drive in accordance with the preceding aspect of the solid state drive.

In one aspect, a method for data storage includes: receiving a first data access transaction at a nonvolatile storage device having 2N planes of memory cells from a controller having a 1N plane hardware interface, wherein the first data access transaction to address 1N planes of memory cells; and receiving a consecutive second data access transaction to address 1N planes at the nonvolatile storage device from the controller; wherein the nonvolatile storage device to interpret the consecutive 1N plane data access transactions as a 2N plane data access transaction.

In one embodiment, the nonvolatile storage device comprises a quad-plane storage device, and wherein the controller includes a dual-plane hardware interface. In one embodiment, N equals 2. In one embodiment, receiving the first data access transaction comprises receiving a write to the nonvolatile storage device. In one embodiment, further comprising: receiving a first configuration setting at the nonvolatile storage device from the controller prior to the first data access transaction; and ignoring an execute command of the first data access transaction based on the first configuration setting. In one embodiment, further comprising: receiving a second configuration setting at the nonvolatile storage device from the controller between the first data access transaction and the second data access transaction; and executing an execute command of the second data access transaction based on the second configuration setting. In one embodiment, the execute command comprises a confirm command. In one embodiment, further comprising ignoring a confirm command of the first data access transaction based on receiving the first configuration setting. In one embodiment, further comprising ignoring the execute command of the first data access transaction and automatically clearing the first configuration setting in response to receiving the first configuration setting. In one embodiment, receiving the first data access transaction comprises receiving a read at the nonvolatile storage device. In one embodiment, further comprising generating two 1N plane command sequences to transfer 2N planes of data from the nonvolatile storage device to the controller in response to the read. In one embodiment, further comprising sending a 2N plane command sequence from the nonvolatile storage device to the controller, which the controller interprets as two 1N plane command sequences.

In one aspect, an article of manufacture comprising a computer readable storage medium having content stored thereon to cause execution of operations to execute a method for data transfer in accordance with any embodiment of the preceding aspect of the method. In one aspect, an apparatus for data transfer includes means for performing operations to execute a method in accordance with any embodiment of the preceding aspect of the method.

In one aspect, a computing system includes: a multicore processor to execute instructions; a volatile memory device to store data to be executed by the processor; and a solid state drive coupled to the processor and the volatile memory device, the solid state drive including a nonvolatile storage device including a number 2N of planes of memory cells; and a controller including a 1N plane hardware interface coupled to the nonvolatile storage device; wherein a data access transaction between the controller and the nonvolatile storage device includes first and second consecutive 1N plane command sequences interpreted as a single 2N plane command sequence. In one embodiment, further comprising one or more of a network adapter coupled to exchange data between the memory modules and a remote network location; a display communicatively coupled to the processor; or, a battery to power the computing system.

In one aspect, a method for storing data includes: sending a first data access transaction from a controller having a 1N plane hardware interface to a nonvolatile storage device having 2N planes of memory cells, wherein the first data access transaction to address 1N planes of memory cells; and sending a consecutive second data access transaction to address 1N planes from the controller to the nonvolatile storage device; wherein the nonvolatile storage device to interpret the consecutive 1N plane data access transactions as a 2N plane data access transaction.

In one embodiment, the nonvolatile storage device comprises a quad-plane storage device, and wherein the controller includes a dual-plane hardware interface. In one embodiment, N equals 2. In one embodiment, sending the first data access transaction comprises sending a write to the nonvolatile storage device. In one embodiment, further comprising: sending a first configuration setting from the controller to the nonvolatile storage device prior to the first data access transaction to cause the nonvolatile storage device to ignore an execute command of the first data access transaction. In one embodiment, further comprising: sending a second configuration setting from the controller to the nonvolatile storage device between the first data access transaction and the second data access transaction to cause the nonvolatile storage device to execute an execute command of the second data access transaction. In one embodiment, the execute command comprises a confirm command. In one embodiment, sending the first configuration setting is to cause the nonvolatile storage device to ignore a confirm command of the first data access transaction. In one embodiment, sending the first configuration setting is to cause the nonvolatile storage device to ignore the execute command of the first data access transaction and automatically clear the first configuration setting. In one embodiment, sending the first data access transaction comprises sending a read to the nonvolatile storage device. In one embodiment, further comprising the nonvolatile storage device generating two 1N plane command sequences to transfer 2N planes of data to the controller. In one embodiment, further comprising the nonvolatile storage device sending a 2N plane command sequence, which the controller interprets as two 1N plane command sequences.

In one aspect, an article of manufacture comprising a computer readable storage medium having content stored thereon to cause execution of operations to execute a method for data transfer in accordance with the aspect of the method above. In one aspect, an apparatus for data transfer includes means for performing operations to execute a method in accordance with the aspect of the method above.

Flow diagrams as illustrated herein provide examples of sequences of various process actions. The flow diagrams can indicate operations to be executed by a software or firmware routine, as well as physical operations. In one embodiment, a flow diagram can illustrate the state of a finite state machine (FSM), which can be implemented in hardware and/or software. Although shown in a particular sequence or order, unless otherwise specified, the order of the actions can be modified. Thus, the illustrated embodiments should be understood only as an example, and the process can be performed in a different order, and some actions can be performed in parallel. Additionally, one or more actions can be omitted in various embodiments; thus, not all actions are required in every embodiment. Other process flows are possible.

To the extent various operations or functions are described herein, they can be described or defined as software code, instructions, configuration, and/or data. The content can be directly executable ("object" or "executable" form), source code, or difference code ("delta" or "patch" code). The software content of the embodiments described herein can be provided via an article of manufacture with the content stored thereon, or via a method of operating a communication interface to send data via the communication interface. A machine readable storage medium can cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

Various components described herein can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications can be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A solid state drive comprising:
a nonvolatile storage device including a second number of planes of memory cells; and
a controller including a hardware interface coupled to the nonvolatile storage device, the hardware interface to provide access to a first number of planes of memory cells in the nonvolatile storage device, the first number of planes of memory cells being different than the second number of planes of memory cells;
wherein a data access transaction between the controller and the nonvolatile storage device includes first and second consecutive command sequences, each pair of the first and second command sequences to access the first number of planes of memory cells collectively being interpreted as a single command sequence to access the second number of planes of memory cells, and
wherein the nonvolatile storage device to ignore a first execute command associated with the first command sequence, and to execute the first and second command sequences in response to a second execute command associated with the second command sequence.

2. The solid state drive of claim 1, wherein the nonvolatile storage device comprises a quad-plane storage device, and wherein the controller includes a dual-plane hardware interface.

3. The solid state drive of claim 1, wherein the data access transaction comprises a write from the controller to the nonvolatile storage device.

4. The solid state drive of claim 3, further comprising the controller to set the nonvolatile storage device to a first configuration prior to the first command sequence, and to set the nonvolatile storage device to a second configuration between the first command sequence and the second command sequence.

5. The solid state drive of claim 1, wherein the execute command comprises a confirm command.

6. The solid state drive of claim 1, wherein the data access transaction comprises a read from the nonvolatile storage device to the controller.

7. The solid state drive of claim 6, further comprising the nonvolatile storage device to generate first and second command sequences, each of the first and second command sequences to access the first number of planes of memory cells to transfer the second number of planes of memory cells of data to the controller.

8. The solid state drive of claim 6, further comprising the nonvolatile storage device to send a third command sequence to access the second number of planes of memory cells, which the controller interprets as a pair of first and second command sequences, each one of the first command sequence and the second command sequence to access the first number of planes of memory cells.

9. A computing system, comprising:
a multicore processor to execute instructions;
a volatile memory device to store data to be executed by the processor; and
a solid state drive coupled to the processor and the volatile memory device, the solid state drive including
a nonvolatile storage device including a second number of planes of memory cells; and
a controller including a hardware interface coupled to the nonvolatile storage device, the hardware interface to provide access to a first number of planes of memory cells in the nonvolatile storage device, the first number of planes of memory cells being different than the second number of planes of memory cells;
wherein a data access transaction between the controller and the nonvolatile storage device includes first and second consecutive command sequences, each pair of the first and second command sequences to access the first number of planes of memory cells collectively being interpreted as a single command sequence to access the second number of planes of memory cells; and
wherein the nonvolatile storage device to ignore a first execute command associated with the first command sequence, and to execute the first and second command sequences in response to a second execute command associated with the second command sequence.

10. The computing system of claim 9, wherein the data access transaction comprises a write from the controller to the nonvolatile storage device, and further comprising the controller to set the nonvolatile storage device to a first configuration prior to the first command sequence, and to set the nonvolatile storage device to a second configuration between the first command sequence and the second command sequence.

11. The computing system of claim 9, wherein the data access transaction comprises a write from the controller to the nonvolatile storage device.

12. The computing system of claim 9, wherein the data access transaction comprises a read from the nonvolatile storage device to the controller, and further comprising the nonvolatile storage device to generate a pair of first and second command sequences, each one of the first command sequence and the second command sequence to access the first number of planes of memory cells to collectively transfer the second number of planes of memory cells of data to the controller.

13. The computing system of claim 9, further comprising one or more of
a network adapter coupled to exchange data between the memory modules and a remote network location;
a display communicatively coupled to the processor; or,
a battery to power the computing system.

14. A method for storing data, comprising:
sending a first configuration setting from a controller having a hardware interface to a nonvolatile storage device, the hardware interface to provide access to a first number of planes of memory cells of the nonvolatile storage device, the nonvolatile storage device having a second number of planes of memory cells, prior to a first data access transaction to cause the nonvolatile storage device to ignore an execute command of the first data access transaction;
sending a first data access transaction from the controller to the nonvolatile storage device, wherein the first data access transaction to address the first number of planes of memory cells, the first number of planes of memory cells being different than the second number of planes of memory cells; and
sending a consecutive second data access transaction to address the first number of planes of memory cells from the controller to the nonvolatile storage device;
wherein the nonvolatile storage device to interpret the consecutive first and second data access transactions as a third data access transaction to access the second number of planes of memory cells.

15. The method of claim 14, wherein the second number of planes of memory cells is twice the first number of planes of memory cells.

16. The method of claim 14, further comprising:
sending a second configuration setting from the controller to the nonvolatile storage device between the first data access transaction and the second data access transaction to cause the nonvolatile storage device to execute an execute command of the second data access transaction.

17. The method of claim 14, wherein sending the first configuration setting is to cause the nonvolatile storage device to ignore a confirm command of the first data access transaction.

18. The method of claim 14, wherein sending the first configuration setting is to cause the nonvolatile storage device to ignore the execute command of the first data access transaction and automatically clear the first configuration setting.

* * * * *